(12) United States Patent
Zhao et al.

(10) Patent No.: US 12,604,364 B2
(45) Date of Patent: Apr. 14, 2026

(54) TRANSMITTING REFERENCE SIGNAL FOR POSITIONING

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/750,872

(22) Filed: Jun. 21, 2024

(65) Prior Publication Data

US 2024/0349394 A1     Oct. 17, 2024

Related U.S. Application Data

(63) Continuation of application No. PCT/CN2021/140909, filed on Dec. 23, 2021.

(51) Int. Cl.
*H04W 76/28*          (2018.01)

(52) U.S. Cl.
CPC ................................. *H04W 76/28* (2018.02)

(58) Field of Classification Search
CPC ....... H04W 76/28; H04W 4/02; H04W 4/025; H04W 4/20; H04W 24/08; H04W 64/00; H04L 5/0053; Y02D 30/70
See application file for complete search history.

(56) References Cited

U.S. PATENT DOCUMENTS

| | | | | |
|---|---|---|---|---|
| 8,780,880 B2 * | 7/2014 | Lin | ................... | H04W 72/1215 |
| | | | | 370/458 |
| 2017/0359849 A1 | 12/2017 | Zhang et al. | | |
| 2019/0373573 A1 | 12/2019 | Cui et al. | | |
| 2021/0345247 A1 * | 11/2021 | Zhou | .................... | H04W 76/28 |
| 2021/0360733 A1 | 11/2021 | Bao et al. | | |
| 2022/0399976 A1 * | 12/2022 | Wang | ................... | H04L 5/0092 |

FOREIGN PATENT DOCUMENTS

| | | | | |
|---|---|---|---|---|
| CN | 112075109 A | 12/2020 | | |
| CN | 113497687 | 10/2021 | | |
| CN | 113678513 | 11/2021 | | |
| WO | WO-2013162439 A2 * | 10/2013 | ........... | H04L 1/0026 |

(Continued)

OTHER PUBLICATIONS

International Search Report and Written Opinion in International Appln. No. PCT/CN2021/140909, mailed on Aug. 29, 2022, 16 pages (with partial English translation).

(Continued)

*Primary Examiner* — Ayanah S George
(74) *Attorney, Agent, or Firm* — Fish & Richardson P.C.

(57) ABSTRACT

Provided are a wireless communication method and a communication apparatus. The method includes: receiving, by a positioning device in a core network, first information associated with DRX; and determining, by the positioning device, a transmission time of a first signal based on the first information, where the first signal is a reference signal for positioning, and the transmission time of the first signal is within a first time period. The first time period is determined based on at least a parameter of the DRX.

13 Claims, 4 Drawing Sheets

(56)                    References Cited

FOREIGN PATENT DOCUMENTS

| | | | |
|---|---|---|---|
| WO | WO-2021029934 A1 * | 2/2021 | ............ H04W 72/51 |
| WO | WO 2021088087 | 5/2021 | |
| WO | WO 2021139521 | 7/2021 | |
| WO | WO 2021154420 | 8/2021 | |
| WO | WO 2021185276 | 9/2021 | |
| WO | WO 2021231385 | 11/2021 | |

OTHER PUBLICATIONS

Lenovo et al., "CSI/SRS reporting for WUS," 3GPP TSG-RAN WG2 Meeting #107bis, R2-1912689, Chongqing, China, Oct. 14-18, 2019, 3 pages.
Office Action in Chinese Appln. No. 202180016435.3, mailed on May 21, 2024, 21 pages (with English translation).
Vivo, "Discussion on potential positioning enhancements," 3GPP TSG RAN WG1 #103-e, R1-2007666, e-Meeting, Oct. 26-Nov. 13, 2020, 49 pages.
Vivo, "Discussion on SRS for positioning during the DRX inactive period," 3GPP TSG-RAN WG2 Meeting #110-e, R2-2004461, Online, Jun. 1-12, 2020, 4 pages.
Vivo, "Discussion on the impact of DRX on SRS for NR positioning," 3GPP TSG-RAN WG2 Meeting #109bis-e, R2-2002618, Electronic, Apr. 20-30, 2020, 3 pages.
Office Action in Chinese Appln. No. 202180016435.3, mailed on Oct. 25, 2024, 26 pages (with English translation).
Partial Supplementary European Search Report in European Appln. No. 21968608.6, mailed on Feb. 4, 2025, 16 pages.

* cited by examiner

TRANSMITTING REFERENCE SIGNAL FOR POSITIONING

CROSS-REFERENCE TO RELATED APPLICATIONS

The present application is a continuation of International Application No. PCT/CN2021/140909, filed on Dec. 23, 2021, the disclosure of which is hereby incorporated by reference in its entirety.

TECHNICAL FIELD

The present application relates to the technical field of communications, and more specifically, to a wireless communication method and a communication apparatus.

BACKGROUND

According to a current protocol, a discontinuous reception (DRX) mode and positioning measurement of a terminal device are designed independently of each other. Mutually independent design of the DRX mode and the positioning measurement causes power consumption problems.

SUMMARY

In view of the foregoing problems, the present application provides a wireless communication method and a communication apparatus.

According to a first aspect, a wireless communication method is provided, including: receiving, by a positioning device in a core network, first information associated with DRX; determining, by the positioning device, a transmission time of a first signal based on the first information, where the first signal is a reference signal for positioning, and the transmission time of the first signal is within a first time period. The first time period corresponds to an active time of the DRX, or the first time period corresponds to a possible active time of the DRX.

According to a second aspect, a wireless communication method is provided, including: sending, by a terminal device or a base station, first information associated with DRX to a positioning device in a core network. The first information is used to determine a transmission time or a measurement time of a first signal, the first signal is a reference signal for positioning, and the transmission time of the first signal is within a first time period; and the first time period corresponds to an active time of the DRX; or the first time period corresponds to a possible active time of the DRX.

According to a third aspect, a wireless communication method is provided, including: if a first time period overlaps a measurement gap, determining that the measurement gap is a valid measurement gap; and/or if the first time period does not overlap a measurement gap, determining that the measurement gap is an invalid measurement gap. The first time period includes one or more of following: a setting time of a DRX on duration timer; an active time of DRX; a time determined based on a setting time of a DRX on duration timer and a time offset value; and a time determined based on an active time of DRX and a time offset value.

According to a fourth aspect, a wireless communication method includes: receiving, by a terminal device, a first downlink control information (DCI), where the first DCI is DCI scrambled by a power saving radio network temporary identifier (PS-RNTI); and starting, by the terminal device, a DRX on duration timer if a priority of positioning measurement in a processing time window is higher than a priority of the first DCI, where the processing time window is used for positioning measurement or sending a sounding reference signal (SRS).

According to a fifth aspect, a wireless communication method is provided, including: sending, by a base station, first downlink control information DCI, where the first DCI is DCI scrambled by a PS-RNTI; and determining, by the base station, that a terminal device starts a DRX on duration timer if a priority of positioning measurement in a processing time window is higher than a priority of the first DCI, where the processing time window is used for positioning measurement or sending an SRS.

According to a sixth aspect, a communication apparatus is provided. The communication apparatus is a positioning device in a core network. The communication apparatus includes: a receiving module, configured to receive first information associated with DRX; and a determining module, configured to determine a transmission time of a first signal based on the first information, where the first signal is a reference signal for positioning, and the transmission time of the first signal is within a first time period. The first time period corresponds to an active time of the DRX, or the first time period corresponds to a possible active time of the DRX.

According to a seventh aspect, a communication apparatus is provided. The communication apparatus is a terminal device or a base station. The communication apparatus includes: a sending module, configured to send first information associated with DRX to a positioning device in a core network, where the first information is used to determine a transmission time or a measurement time of a first signal, the first signal is a reference signal for positioning, and the transmission time of the first signal is within a first time period. The first time period corresponds to an active time of the DRX, or the first time period corresponds to a possible active time of the DRX.

According to an eighth aspect, a communication apparatus is provided, including: a determining module, configured to: if a first time period overlaps a measurement gap, determine that the measurement gap is a valid measurement gap; and/or if the first time period does not overlap a measurement gap, determine that the measurement gap is an invalid measurement gap. The first time period includes one or more of following: a setting time of a DRX on duration timer; an active time of DRX; a time determined based on a setting time of a DRX on duration timer and a time offset value; and a time determined based on an active time of DRX and a time offset value.

According to a ninth aspect, a communication apparatus is provided. The communication apparatus is a terminal device. The communication apparatus includes: a receiving module, configured to receive first DCI, where the first DCI is DCI scrambled by a PS-RNTI; and a starting module, configured to start a DRX on duration timer if a priority of positioning measurement in a processing time window is higher than a priority of the first DCI, where the processing time window is used for positioning measurement or sending an SRS.

According to a tenth aspect, a communication apparatus is provided. The communication apparatus is a base station. The communication apparatus includes: a sending module, configured to send first DCI, where the first DCI is DCI scrambled by a PS-RNTI; and a determining module, configured to determine that a terminal device starts a DRX on duration timer if a priority of positioning measurement in a processing time window is higher than a priority of the first DCI, where the processing time window is used for positioning measurement or sending an SRS.

According to an eleventh aspect, a communication apparatus is provided, including a memory and a processor. The memory is configured to store a program, and the processor is configured to invoke the program in the memory to perform the method according to any one of the first aspect to the fifth aspect.

According to a twelfth aspect, an apparatus is provided, including a processor, configured to invoke a program from a memory to perform the method according to any one of the first aspect to the fifth aspect.

According to a thirteenth aspect, a chip is provided, including a processor, configured to invoke a program from a memory to cause a device equipped with the chip to perform the method according to any one of the first aspect to the fifth aspect.

According to a fourteenth aspect, a computer-readable storage medium is provided. The computer-readable storage medium stores a program that causes a computer to perform the method according to any one of the first aspect to the fifth aspect.

According to a fifteenth aspect, a computer program product is provided. The computer program product includes a program that causes a computer to perform the method according to any one of the first aspect to the fifth aspect.

According to a sixteenth aspect, a computer program is provided, where the computer program causes a computer to perform the method according to any one of the first aspect to the fifth aspect.

DETAILED DESCRIPTIONS OF THE EMBODIMENTS

Communication System

Figures 1, 2:
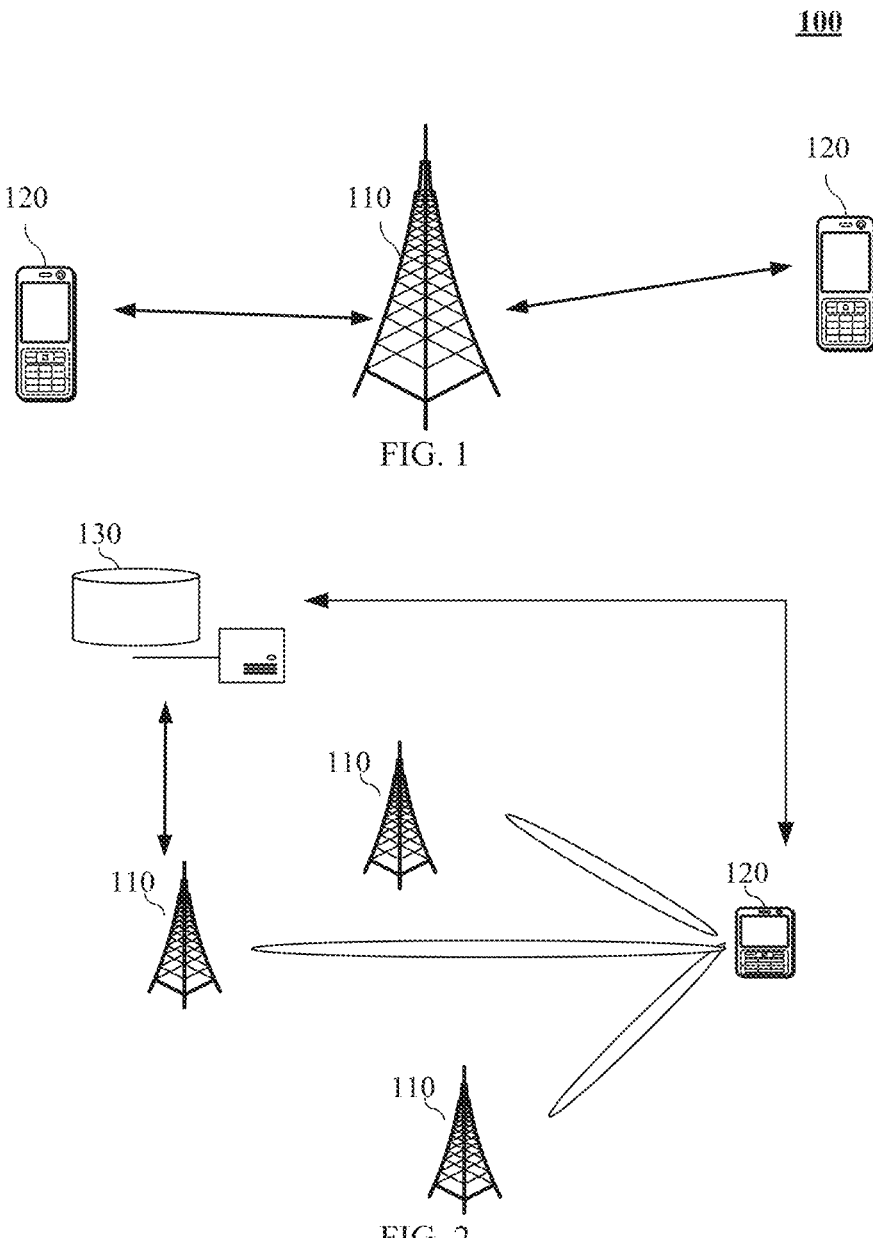
FIG. 1 is a diagram of a system architecture of a communication system to which an embodiment of the present application is applicable.
FIG. 2 is a schematic diagram of positioning measurement performed based on the communication system shown in FIG. 1.

FIG. 1 shows a wireless communication system 100 to which an embodiment of the present application is applicable. The wireless communication system 100 may include a base station 110 and a terminal device 120. The base station 110 may be a device in communication with the terminal device 120. The base station 110 may provide communication coverage for a specific geographic area, and may communicate with the terminal device 120 located within the coverage.

FIG. 1 exemplarily shows one base station and two terminals. Optionally, the wireless communication system 100 may include a plurality of base stations, and another quantity of terminal devices may be included in the coverage of each base station, which is not limited in embodiments of the present application.

Optionally, the wireless communication system 100 may further include other network entities such as a network controller and a mobility management entity, which is not limited in embodiments of the present application.

It should be understood that technical solutions of embodiments of the present application may be applied to various communication systems, such as a 5th generation (5G) system or a new radio (NR) system, a long term evolution (LTE) system, an LTE frequency division duplex (FDD) system, and an LTE time division duplex (TDD) system. The technical solutions provided in the present application may be further applied to a future communication system, such as a 6th generation mobile communication system or a satellite communication system.

The terminal device in the embodiments of the present application may also be referred to as user equipment (UE), an access terminal, a subscriber unit, a subscriber station, a mobile site, a mobile station (MS), a mobile terminal (MT), a remote station, a remote terminal, a mobile device, a user terminal, a terminal, a wireless communication device, a user agent, or a user apparatus. The terminal device in the embodiments of the present application may be a device providing a user with voice and/or data connectivity and capable of connecting people, objects, and machines, such as a handheld device or vehicle-mounted device having a wireless connection function. The terminal device in the embodiments of the present application may be a mobile phone, a tablet computer (pad), a notebook computer, a palmtop computer, a mobile Internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home, or the like. Optionally, the UE may be used to function as a base station. For example, the UE may function as a scheduling entity, and it provides a sidelink signal between UEs in vehicle-to-everything (V2X), device to device (D2D), or the like. For example, a cellular phone and a vehicle communicate with each other by using a sidelink signal. A cellular phone and a smart household device communicate with each other, without the relay of a communication signal through a base station.

The base station in the embodiments of the present application may be a device for communicating with the terminal device. The base station may also be referred to as an access network device or a wireless access network device. The base station in the embodiments of the present application may be a radio access network (RAN) node (or device) that connects the terminal device to a wireless network. The base station may broadly cover following various names, or may be replaced with following names: a NodeB, an evolved NodeB (eNB), a next generation NodeB (gNB), a relay station, a transmitting and receiving point (TRP), a transmitting point (TP), a master eNode MeNB, a secondary eNode SeNB, a multi-standard radio (MSR) node, a home base station, a network controller, an access node, a radio node, an access point (AP), a transmission node, a transceiver node, a baseband unit (BBU), a remote radio unit (RRU), an active antenna unit (AAU), a remote radio head (RRH), a central unit (CU), a distributed unit (DU), a positioning node, and the like. The base station may be a macro base station, a micro base station, a relay node, a donor node, or the like, or a combination thereof. Alternatively, the base station may be a communication module, a modem, or a chip disposed in the device or apparatus described above. Alternatively, the base station may be a mobile switching center, a device that functions as a base station in D2D, V2X, and machine-to-machine (M2M) communications, a network-side device in a 6G network, a device that functions as a base station in a future communication system, or the like. The base station may support networks with a same access technology or different access technologies. A specific technology and specific device form used by the base station are not limited in the embodiments of the present application.

The base station may be a fixed or mobile base station. For example, a helicopter or an unmanned aerial vehicle may be configured to function as a mobile base station, and one or more cells may move according to a position of the mobile base station. In another example, a helicopter or an unmanned aerial vehicle may be configured to serve as a device in communication with another base station.

In some deployments, the base station in the embodiments of the present application may be a CU or a DU, or the base station may include a CU and a DU. The gNB may further include an AAU.

The base station and the terminal device may be deployed on land, including an indoor or outdoor scenario and a handheld or vehicle-mounted scenario, or may be deployed on water, or may be deployed on an airplane, a balloon, or a satellite in the air. In the embodiments of the present application, the scenarios in which the base station and the terminal device are located are not limited.

Positioning Technology in the Communication System

Referring to FIG. 2, a communication system 100 may further include a positioning device 130. The positioning device 130 may be configured to determine location information of a terminal device. The positioning device 130 may be located in a core network. The positioning device 130 may sometimes also be referred to as a positioning server. An NR system is used as an example, and the positioning device 130 may be a location management function (LMF). Another communication system is used as an example, and the positioning device 130 may be a location management unit (LMU), a location management center (LMC), or an evolved serving mobile location center (E-SMLC). It may be understood that, the positioning device 130 may alternatively be another network element, node or device for determining the location information of a terminal device, for example, may be a network element or node in a future communication system for determining the location information of a terminal device, and a name of the positioning device is not specifically limited in the embodiments of the present application.

Positioning in the communication system 100 includes uplink positioning and downlink positioning. In some communication systems (such as the NR system), downlink positioning is performed based on a positioning reference signal (PRS). The PRS, also referred to as a downlink positioning reference signal (DL-PRS), is a reference signal for a positioning function. For example, in a downlink positioning process, the terminal device 120 may first measure PRSs sent by a serving cell and a neighboring cell (or an adjacent cell), and estimate related information of positioning measurement. The terminal device 120 may then report the related information of positioning measurement to the positioning device 130 as a measurement result of the PRS. The positioning device 130 may calculate a location of the terminal device 120 based on the related information of positioning measurement reported by the terminal device 120, so as to obtain the location information of the terminal device 120. For example, the positioning device 130 may calculate the location information of the terminal device 120 based on a trilateration method or a triangulation method.

In some communication systems, such as the NR system, uplink positioning is performed based on an SRS. For example, in an uplink positioning process, the terminal device 120 sends an SRS. Base stations 110 (a base station providing a serving cell and a base station providing a neighboring cell) may obtain a measurement result based on the SRS sent by the terminal. The measurement result of the SRS may include related information of positioning measurement. The base stations 110 may then send the related information of positioning measurement to the positioning device 130. The positioning device 130 may calculate a location of the terminal device 120 based on the related information of positioning measurement reported by the base stations 110, so as to obtain the location information of the terminal device 120. For example, the positioning device 130 may calculate the location information of the terminal device 120 based on a trilateration method or a triangulation method.

The related information of positioning measurement may include one or more of following information: time information, distance information, power information, and angle information. More specifically, the related information of positioning measurement may include one or more of following information: a time difference of arrival (TDOA), an angle difference of arrival (ADOA), a reference signal received power (RSRP), and the like.

DRX Mode

Figures 3, 4, 5:
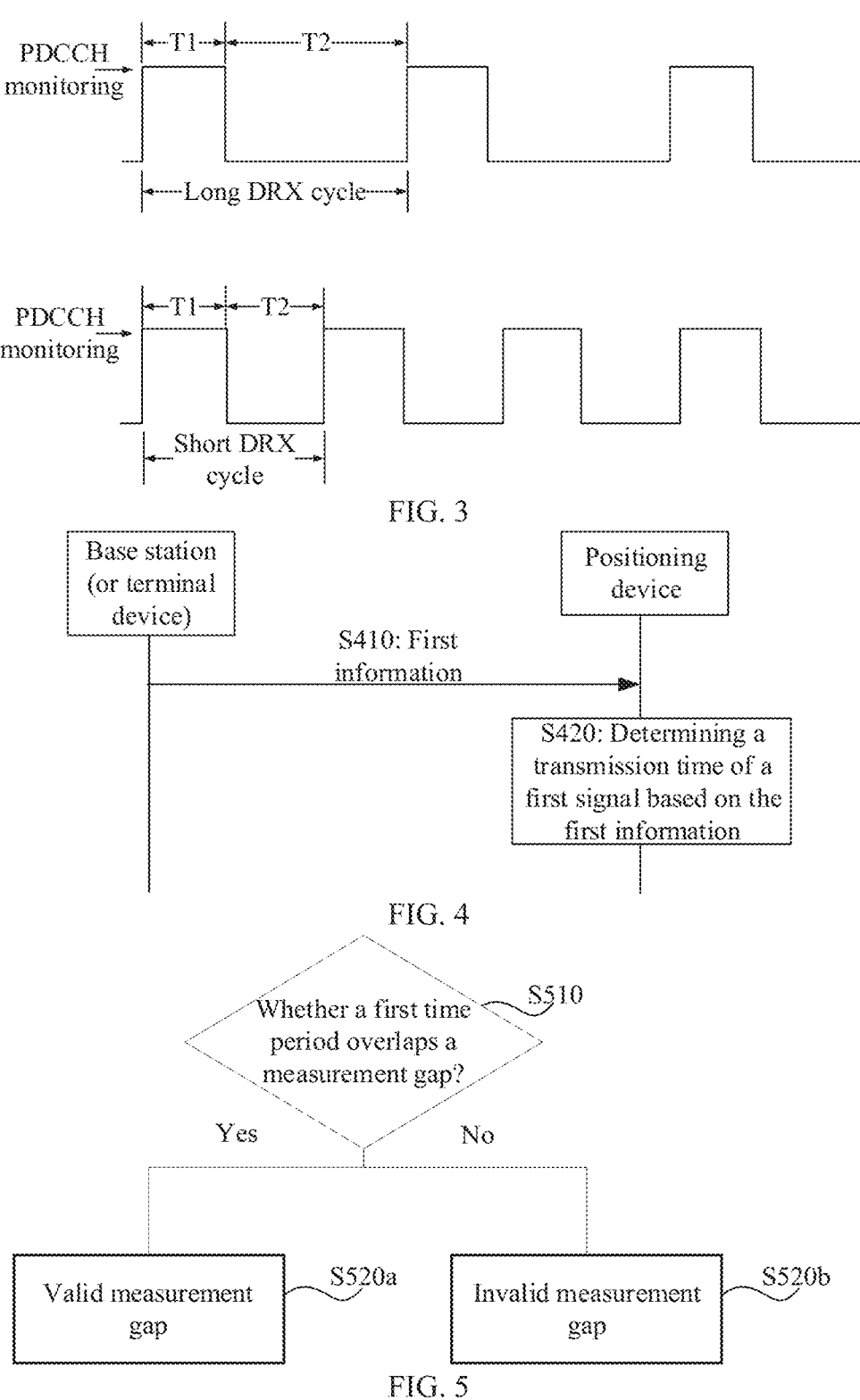
FIG. 3 is a schematic diagram of a DRX cycle.
FIG. 4 is a schematic flowchart of a wireless communication method according to Embodiment 1.
FIG. 5 is a schematic flowchart of a wireless communication method according to Embodiment 2.

FIG. 3 is a schematic diagram of a DRX cycle. As shown in FIG. 3, T1 is a wake-up time of a terminal device, or referred to as a DRX on duration. T2 is a sleep time of the terminal device, or referred to as an opportunity for DRX.

A time length of the wake-up time of the terminal device may be controlled by a DRX on duration timer (drx-onDurationTimer). A timing duration of the DRX on duration timer is T1. The terminal device needs to continuously monitor a physical downlink control channel (PDCCH) in the wake-up time T1, and may not monitor the PDCCH in the sleep time T2. It may be understood that a larger value of T2 indicates a lower power consumption of the terminal device.

It can be learned from FIG. 3 that, for a long DRX cycle, the terminal device wakes up less frequently, which reduces power consumption of the terminal device, and for a short DRX cycle, the terminal device wakes up more frequently, which increases energy consumption of the terminal device but can improve a probability of successful scheduling of the terminal device by a base station and reduce data transmission delay.

Each medium access control (MAC) entity corresponds to a DRX configuration. The DRX configuration may include the DRX on duration timer described above. In addition, another DRX timer may be included in the DRX configuration to jointly adjust the wake-up time of the terminal device.

The another DRX timer mentioned herein may include, for example, one or more of following timers: a DRX inactivity timer (drx-InactivityTimer), a short DRX cycle timer (drx-ShortCycleTimer), a DRX downlink retransmission timer (drx-RetransmissionTimerDL), and a DRX downlink hybrid automatic repeat reQuest (HARQ) round-trip time (RTT) timer (HARQ-RTT-TimerDL).

The DRX inactivity timer may indicate how long a PDCCH needs to be monitored after the terminal device successfully detects the PDCCH. The short DRX cycle timer may indicate a duration for which the terminal device follows a short DRX cycle. The DRX downlink retransmission timer may be used by the terminal device to receive downlink retransmission scheduling. This timer may indicate a duration for continuously monitoring by the terminal device in order to receive expected downlink retransmission scheduling. The DRX downlink HARQ RTT timer (HARQ-RTT-TimerDL) is used by the terminal device to receive downlink retransmission scheduling, and indicates a duration that the terminal device needs to wait before receiving expected downlink retransmission scheduling.

Further, the base station may configure other DRX parameters for the terminal device, such as a short DRX cycle, a long DRX cycle and DRX start subframe offset (drx-LongCycleStartOffset), and a DRX slot offset (drx-SlotOffset); and configure other DRX timers, such as a random access contention resolution timer (ra-ContentionResolution-Timer), a DRX uplink retransmission timer (drx-RetransmissionTimerUL), and a DRX uplink HARQ round-trip time timer (HARQ-RTT-TimerUL).

In a DRX mechanism, configuration of a long DRX cycle may be a default configuration, and configuration of a short DRX cycle may be an optional configuration. For a terminal device with a short DRX cycle configured, conversion between a long DRX cycle and the short DRX cycle may be performed in following manner.

When any of following conditions are satisfied, the terminal device uses the short DRX cycle: (1) the DRX inactivity timer (drx-InactivityTimer) expires; and (2) the terminal device receives a DRX command MAC CE (DRX Command MAC CE).

When any of following conditions are satisfied, the terminal device uses the long DRX cycle: (1) the short DRX cycle timer (Drx-shortCycleTimer) expires; and (2) the terminal device receives a long DRX command MCA CE.

Regardless of whether the long DRX cycle or the short DRX cycle is used, if one or more of following cases exist, the terminal device is in a DRX active state (sometimes also referred to as a DRX on state), and a time corresponding to the DRX active state may be referred to as an active time (active time) of DRX.

Case 1: Any one of the DRX on duration timer, the DRX inactivity timer, the DRX downlink retransmission timer, the DRX uplink retransmission timer, and the random access contention resolution timer is running.

Case 2: The terminal device has transmitted a scheduling request (SR) on a physical uplink control channel (PUCCH) and the SR is in a pending state.

Case 3: A HARQ buffer of the terminal device has data and the terminal device waits for an uplink grant (UL grant) for HARQ retransmission.

Case 4: The terminal device has successfully received a random access response (RAR) that responds to a preamble not selected by an MAC entity, but has not received a PDCCH indicating an initial transmission and using a cell radio network temporary identifier (C-RNTI) of the MAC entity.

In a DRX cycle, except for the active time of the DRX, the remaining time may be referred to as an inactive time of the DRX or a sleep time of the DRX. During the sleep time, the terminal device is in a sleep state (sometimes also referred to as a DRX off state).

Positioning in the DRX Mode

When the terminal device is in a sleep state, a current protocol specifies that the terminal device is not allowed to send a periodic SRS or a semi-persistent SRS, but may send an aperiodic SRS. In addition, when the terminal device is in the sleep state, the current protocol does not restrict the terminal device from measuring a PRS. It can be learned that even in the sleep state, the terminal device may send an SRS (such as an aperiodic SRS) for uplink positioning, and may measure a PRS for downlink positioning. Therefore, according to the current protocol, the DRX mode and uplink and downlink positioning are designed independently of each other. In other words, currently, a positioning process of the communication system is not designed from the perspective of energy saving. Mutually independent design of the DRX mode and the positioning measurement causes communication problems, such as power consumption or delay problems. Therefore, how to make the DRX mode and the positioning measurement cooperate with each other is a problem needing to be resolved urgently. the foregoing problems are resolved following with reference to multiple embodiments from different perspectives.

Wake-Up Signal

For further energy saving of the terminal device, some communication systems (such as NR Rel-16) introduce a wake-up mechanism based on a wake-up signal (or referred to as a power-saving wake-up signal). The wake-up signal can be used in combination with a DRX mechanism. For example, the terminal device may receive a wake-up signal before a DRX on duration. If the terminal device has data transmission in a DRX cycle, the wake-up signal may wake up the terminal device, so that the terminal device detects a PDCCH during the DRX on duration. If the terminal device has no data transmission in a DRX cycle, the wake-up signal may not wake up the terminal device. In this case, the terminal device may not start a DRX on duration timer, so that detection of the PDCCH is not required. Therefore, the introduction of the wake-up signal makes it possible for the terminal device to omit PDCCH detection during a specific DRX on duration or some DRX on durations, thereby achieving further energy saving. It should be noted that, in the embodiments of the present application, if a communication system supports the wake-up mechanism, the terms "wake-up state" and "active state" as well as the terms "wake-up time" and "active time" may be used interchangeably according to a specific context.

Embodiment 1

As mentioned above, in a current protocol, the DRX mode and the uplink and downlink positioning are designed independently of each other, which means that even in the sleep state, the terminal device may be woken up, thereby increasing power consumption of the terminal device. For example, after the terminal device enters a sleep state, the terminal device may need to wake up from the sleep state, to implement uplink/downlink synchronization, and then send an SRS for positioning or receive a PRS, which prevents the terminal device from entering a deep sleep state. Embodiment 1 is intended to prevent, as much as possible, a terminal device from waking up from a sleep state, so as to reduce power consumption of the terminal device. Embodiment 1 is described below in more detail with examples with reference to FIG. 4.

FIG. 4 shows a wireless communication method according to Embodiment 1 of the present application. The method illustrated in FIG. 4 is described from the perspective of interaction between a positioning device and a base station (or a terminal device). For related descriptions of the terminal device, the base station, and the positioning device, reference may be made to the foregoing descriptions. An NR system is used as an example, the base station may be a gNB, and the positioning device may be an LMF.

As shown in FIG. 4, in Step S410, the base station (or the terminal device) sends first information to the positioning device. If the base station sends the first information to the positioning device, the base station may send the first information through NRPPa signaling. If the terminal device sends the first information to the positioning device, the terminal device may send the first information through LPP signaling.

The first information may be associated with DRX. The first information may be information specific to per terminal device, or may be statistical information of multiple terminal devices in a cell in which the foregoing terminal device is located.

The first information may be used to determine an active time of DRX (or a possible active time of DRX, which may also be referred to as a potential active time of DRX). Content of the first information is not specifically limited in the embodiments of the present application, and the first information may be any type of information that helps the positioning device determine the active time of the DRX (or the possible active time of the DRX). In an example, the first information may be a parameter of a DRX on duration timer and/or a parameter of a DRX inactivity timer. In another example, the first information may directly indicate the active time (or the possible active time) of the DRX. For example, the first information may directly indicate a starting moment and a duration of the active time of the DRX.

Still referring to FIG. 4, in Step S420, the positioning device determines a transmission time of a first signal based on the first information. The first signal is a signal for positioning (or positioning the terminal device). The first signal may be a reference signal (or a positioning pilot). The reference signal may include an uplink positioning reference signal and/or a downlink positioning reference signal. The uplink positioning reference signal may include, for example, an SRS. The downlink positioning reference signal may include, for example, a PRS. When an SRS is used as an example, the first signal may be an aperiodic SRS and/or a periodic SRS. When a PRS is used as an example, the first signal may be an aperiodic PRS, a periodic PRS, and/or an on-demand PRS (on-demand PRS). From the perspective of a terminal or a base station, the first information is used to determine a transmission time or a measurement time of the first signal. For example, when uplink positioning is used as an example, the first information may be used to determine a transmission time of the first signal (such as an SRS). For another example, when downlink positioning is used as an example, the first information may be used to determine a measurement time of the first signal (such as a PRS).

The positioning device may determine the transmission time of the first signal based on the first information. The transmission time of the first signal may be within a first time period. The first time period may be associated with one or more of following information: an active time of the DRX, the possible active time of the DRX, a DRX on duration timer, a DRX inactivity timer, and a wake-up signal.

In some embodiments, the first time period may correspond to the active time of the DRX. For example, the first time period may be located within a time corresponding to the active time of the DRX.

In some other embodiments, the first time period may correspond to a possible active time of the DRX. For example, the first time period may be located within the possible active time of the DRX. The possible active time of the DRX may include one or more of following: a setting time of the DRX on duration timer; and a time determined based on a setting time of the DRX on duration timer and a length of the DRX inactivity timer.

Following describes, in detail, "setting time of the DRX on duration timer" and "time determined based on a setting time of the DRX on duration timer and a length of the DRX inactivity timer" mentioned above and why they are possible active times of the DRX.

The setting time of the DRX on duration timer may include: a runnable time of the DRX on duration timer (the runnable time may be set according to a protocol), and the runnable time is independent of a wake-up signal (such as DCI scrambled by a PS-RNTI) indicating whether the terminal device is awake. In other words, the DRX on duration timer is set according to the protocol. Regardless of whether the wake-up signal indicates that the terminal device needs to wake up in a subsequent DRX cycle, the runnable time of the DRX on duration timer does not change dynamically. In other words, the setting time of the DRX on duration timer may be the active time of the DRX, or may not be the active time of the DRX. For example, if a wake-up signal is configured in a system, and the wake-up signal indicates that the terminal device does not need to wake up, the DRX on duration timer is not run, and the setting time of the DRX on duration timer does not belong to the active time of the DRX. For another example, if no wake-up signal is configured in a system, or if a wake-up signal is configured in a system and the wake-up signal indicates that the terminal device needs to wake up, the setting time of the DRX on duration timer belongs to the active time of the DRX.

The length of the DRX inactivity timer is predictable. However, a starting point of the DRX inactivity timer changes according to a packet arriving status and is difficult to determine in advance. Therefore, the time determined based on the setting time of the DRX on duration timer and the length of the DRX inactivity timer (for example, a time obtained by adding the length of the DRX inactivity timer to the setting time of the DRX on duration timer) may belong to the active time of the DRX or may not belong to the active time of the DRX.

In some embodiments, the first time period may include one or more of following: a preset time window; a time determined based on the setting time of the DRX on duration timer; and a time determined based on the setting time of the DRX on duration timer and a time offset value; a time determined based on the length of the DRX inactivity timer; a time determined based on the length of the DRX inactivity timer and a time offset value; a time determined based on the possible active time of the DRX; and a time determined based on the possible active time of the DRX and a time offset value.

As described above, the terminal device wakes up in the active time of the DRX. After wake-up, each component of the terminal device enters a working state. Performing positioning measurement or sending an SRS for positioning in this period does not occupy a sleep time of the terminal device, without a need of additional synchronization for positioning measurement (when waking up from the sleep time, the terminal device needs to be first synchronized with the base station). However, a starting point and an end point of the active time of the DRX change according to the packet arriving status and the wake-up signal, and are difficult to determine in advance. Following is proposed in this embodiment of the present application: determining a time period (namely, the first time period described above) based on a DRX parameter. This time period may be determined in advance and may be used for performing positioning measurement or sending an SRS for positioning.

In some embodiments, the time offset value is predefined by a protocol or configured by the base station.

In some embodiments, the time offset value may be determined based on the length of the DRX inactivity timer. Alternatively, a time length of the time offset value may be associated with the length of the DRX inactivity timer. Alternatively, a length of the time offset value may match the length of the DRX inactivity timer.

In some embodiments, the first time period includes a part or all of the setting time of the DRX on duration timer; or in some embodiments, a starting time of the first time period is after the end of the setting time of the DRX on duration timer.

In an example, if the first time period is determined based on the setting time of the DRX on duration timer, the starting time of the first time period may be located at the end of a DRX on duration offset by a time. The time of the offset may be defined by the time offset value mentioned above. The length of the time offset value may be configured by a higher layer, or may be determined based on the length of the DRX inactivity timer. Advantages of the foregoing configuration manners of the first time period are as follows: The positioning measurement does not cover the setting time of the DRX on duration timer, and during the setting time of the DRX on duration timer, the base station and the terminal device may send and receive data, and the DRX on duration timer may enter a running state. After the end of the DRX on duration timer, a specific amount of time may be reserved, so that the base station and the terminal device complete data transmission and reception of this current DRX cycle. In an example, a value corresponding to the time offset value may be comparable to the length of the DRX inactivity timer.

In some embodiments, when the wake-up signal indicates that the terminal device does not need to wake up in a first DRX cycle, the terminal device may still perform positioning measurement or send an SRS according to the first time period.

In some embodiments, when the wake-up signal indicates that the terminal device does not need to wake up in a first DRX cycle, timing of positioning measurement and sending an SRS may be independent of the setting time of the DRX on duration timer. For example, a starting time of the first time period (that is, a time for positioning measurement) may be close to a reception time of the wake-up signal, so that after receiving the wake-up signal, the terminal device may immediately perform the positioning measurement, to reduce a wake-up time of the terminal device, thereby saving power consumption.

In some embodiments, when the wake-up signal indicates that the terminal device does not need to wake up in a first DRX cycle, the first signal is not transmitted in the first time period. In other words, when the wake-up signal indicates that the terminal device does not need to wake up in the first DRX cycle, the terminal device may not perform positioning measurement or send an SRS in the first time period. In some embodiments, whether to perform positioning measurement or send an SRS in the first time period by the terminal device may be notified through higher-layer signaling.

If the wake-up signal indicates the terminal device to sleep in a subsequent DRX cycle, the terminal device does not enter the active time, and therefore the first time period does not belong to the active time. Even if the first time period does not belong to the active time, a protocol may specify that the terminal device performs positioning measurement or sends an SRS in the first time period. Advantages of this are as follows: The terminal device has already woken up and completed synchronization when receiving the wake-up signal, and since the first time period is usually very close to the reception time of the wake-up signal, the terminal device may still be in a synchronous state and positioning processing in the first time period does not require additional synchronization, thereby saving power consumption.

As mentioned above, when the first time period does not belong to the active time, a protocol may specify that the terminal device still performs positioning measurement or sends an SRS in the first time period. When a delay requirement of a positioning service is not high, due to high complexity of positioning processing and a relatively large quantity of modules of the terminal device participating in positioning, for purposes of energy saving, the positioning may be performed when all modules of the terminal device are enabled.

In this embodiment of the present application, the transmission time of the first signal is set to be within a time corresponding to the active time of the DRX or the possible active time of the DRX, so that positioning measurement occurs in the active time of the DRX as much as possible, thereby reducing power consumption of the terminal device.

Embodiment 2

Embodiment 2 is intended to resolve a relationship between a measurement gap used for positioning measurement and DRX.

FIG. 5 is a schematic flowchart of a wireless communication method according to Embodiment 2 of the present application. The method in FIG. 5 may be performed by a terminal device or by a positioning device (such as an LMF) in a core network.

Referring to FIG. 5, in Step S510, it is determined whether a first time period overlaps with a measurement gap.

In some embodiments, the first time period may include a setting time of a DRX on duration timer. For related explanations about the setting time of the DRX on duration timer, refer to Embodiment 1.

In some embodiments, the first time period may include an active time of DRX. The active time of DRX may refer to an actual active time of DRX (that is, a time during which the terminal device is definitely in an active state), and may also refer to a possible active time of DRX. For related explanations about the possible active time of the DRX, refer to Embodiment 1.

In some embodiments, the first time period may include a time determined based on a setting time of a DRX on duration timer and a time offset value. For example, the first time period may be a sum of the setting time of the DRX on duration timer and the time offset value. The time offset value may be positive or negative. In other words, the setting time of the DRX on duration timer may be offset forward, or the setting time of the DRX on duration timer may be offset backward. The time offset value may be predefined by a protocol or network-configured.

In some embodiments, the first time period may include a time determined based on an active time of DRX and a time offset value. For example, the first time period may be a sum of the active time of the DRX and the time offset value. The time offset value may be positive or negative. In other words, the active time of the DRX may be offset forward or the active time of the DRX may be offset backward. The time offset value may be predefined by a protocol or network-configured.

Still referring to FIG. 5, if the first time period overlaps a measurement gap, Step S520a of determining that the measurement gap is a valid measurement gap is performed (that is, positioning measurement may be performed in the measurement gap). For example, positioning measurement may be performed in an overlapping time between the first time period and the measurement gap. Alternatively, positioning measurement may be performed during the entire measurement gap.

If the first time period does not overlap a measurement gap, Step S520b of determining that the measurement gap is an invalid measurement gap is performed (that is, no positioning measurement is performed in the measurement gap).

Embodiment 3

Some releases (such as R17) of a current protocol support a terminal device in performing positioning measurement outside a measurement gap. However, the protocol requires that positioning measurement outside the measurement gap be performed within a processing time window. In such a scenario, if the terminal device receives DCI scrambled by a PS-RNTI (namely, the wake-up signal described above, where the DCI indicates whether the terminal device needs to wake up to monitor a PDCCH in a wake-up time (on-duration) of DRX), and a priority of positioning measurement in the processing time window is higher than a priority of the DCI scrambled by the PS-RNTI (for example, positioning measurement is used for emergency rescue), it is an appropriate choice for the terminal device to perform positioning measurement within the processing time window. However, the DCI may indicate the terminal device to wake up from a sleep state, or may indicate that the terminal device does not need to wake up from a sleep state. Regarding this case, how to handle it by the terminal device is a problem needing to be resolved urgently. Embodiment 3 is intended to resolve this problem. Embodiment 3 is described below in detail with examples with reference to FIG. 6.

Figures 6, 7, 8, 9, 10:
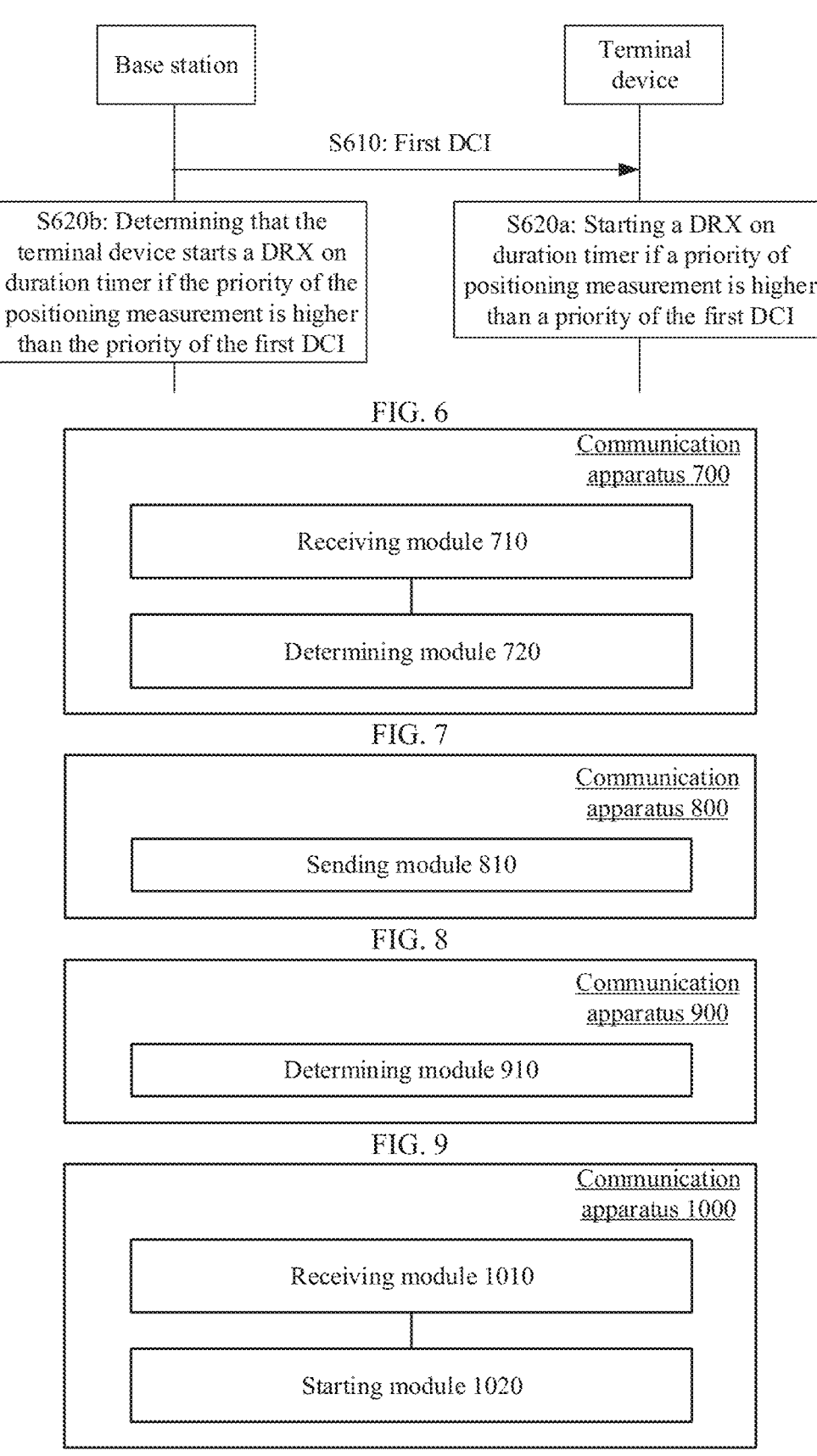
FIG. 6 is a schematic flowchart of a wireless communication method according to Embodiment 3.
FIG. 7 is a schematic diagram of a structure of a communication apparatus according to an embodiment of the present application.
FIG. 8 is a schematic diagram of a structure of a communication apparatus according to another embodiment of the present application.
FIG. 9 is a schematic diagram of a structure of a communication apparatus according to still another embodiment of the present application.
FIG. 10 is a schematic diagram of a structure of a communication apparatus according to still another embodiment of the present application.

FIG. 6 is a schematic flowchart of a wireless communication method according to Embodiment 3. The method illustrated in FIG. 6 is described from the perspective of a terminal device and a base station. For related descriptions of the terminal device and the base station, reference may be made to the foregoing descriptions. For example, the terminal device may be the terminal device 120 in FIG. 1, and the base station may be the base station 110 in FIG. 1.

Referring to FIG. 6, in Step S610, the terminal device receives first DCI. The first DCI may be DCI scrambled by a PS-RNTI. The first DCI may indicate the terminal device to wake up or not wake up for monitoring a PDCCH in a DRX on duration. Alternatively, the first DCI may indicate the terminal device to start a DRX on duration timer or not to start a DRX on duration timer.

In Step S620a, the terminal device starts a DRX on duration timer if a priority of positioning measurement in a processing time window (the processing time window may be used by the terminal device to perform positioning measurement or send an SRS, and the processing time window may be located outside a measurement gap) is higher than a priority of the first DCI. In other words, whether the first DCI indicates the terminal device to start the DRX on duration timer or not to start the DRX on duration timer, the terminal device may directly consider that the first DCI indicates the terminal device to start the DRX on duration timer. That is, if the priority of the positioning measurement is higher than a priority of energy saving, the terminal device may invalidate the first DCI and directly start the DRX on duration timer. Therefore, the terminal device may not detect the first DCI before starting the DRX on duration timer. Similarly, if the priority of the positioning measurement in the processing time window is higher than the priority of the first DCI, the base station may determine that the terminal device starts the DRX on duration timer (refer to Step S620b).

The priority of the positioning measurement in the processing time window and/or the priority of the first DCI (or the priority of the wake-up signal) mentioned above may be configured through higher-level signaling or predefined through a protocol.

The methods embodiments of the present application are described in detail above with reference to FIG. 1 to FIG. 6. Apparatus embodiments of the present application are described in detail below with reference to FIG. 7 and FIG. 12. It should be understood that the description of the method embodiments corresponds to the description of the apparatus embodiments, and therefore, for parts that are not described in detail, reference may be made to the foregoing method embodiments.

FIG. 7 is a schematic diagram of a structure of a communication apparatus according to an embodiment of the present application. A communication apparatus 700 in FIG. 7 may be a positioning device in a core network. The communication apparatus 700 includes a receiving module 710 and a determining module 720.

The receiving module 710 may be configured to receive first information associated with DRX. The determining module 720 may be configured to determine a transmission time of a first signal based on the first information, where the first signal is a reference signal for positioning, and the transmission time of the first signal is within a first time period. The first time period corresponds to an active time of the DRX, or the first time period corresponds to a possible active time of the DRX.

Optionally, the first time period includes one or more of following: a time determined based on a setting time of a DRX on duration timer; a time determined based on a setting time of a DRX on duration timer and a time offset value; a time determined based on a length of a DRX inactivity timer; a time determined based on a length of a DRX inactivity timer and a time offset value; a time determined based on a possible active time of the DRX; and a time determined based on a possible active time of the DRX and a time offset value.

Optionally, the time offset value is determined based on the length of the DRX inactivity timer.

Optionally, the setting time of the DRX on duration timer includes a runnable time of the DRX on duration timer, and the runnable time is independent of a wake-up signal indicating whether a terminal device is awake.

Optionally, when a wake-up signal indicates that a terminal device does not need to wake up in a first DRX cycle, transmission of the first signal is not performed in the first time period; or when a wake-up signal indicates that a terminal device does not need to wake up in a first DRX cycle, transmission of the first signal is performed in the first time period; or when a wake-up signal indicates that a terminal device does not need to wake up in a first DRX cycle, whether to transmit the first signal in the first time period is configured through higher-layer signaling.

Optionally, the possible active time of the DRX includes one or more of following: a setting time of a DRX on duration timer; and a time determined based on a setting time of a DRX on duration timer and a length of a DRX inactivity timer.

Optionally, the first time period includes a part or all of a setting time of a DRX on duration timer; or a starting time of the first time period is after the end of a setting time of a DRX on duration timer.

Optionally, the first information is sent by the base station through NRPPa signaling or sent by a terminal device through LPP signaling.

Optionally, the first signal includes one or more of following signals: an aperiodic SRS, a periodic SRS, an aperiodic PRS, a periodic PRS, and an on-demand PRS.

FIG. 8 is a schematic diagram of a structure of a communication apparatus according to another embodiment of the present application. A communication apparatus 800 in FIG. 8 may be a terminal device or a base station. The communication apparatus 800 includes a sending module 810.

The sending module 810 may be configured to send first information associated with DRX to a positioning device in a core network, where the first information is used to determine a transmission time or a measurement time of a first signal, the first signal is a reference signal for positioning, and the transmission time of the first signal is within a first time period. The first time period corresponds to an active time of the DRX, or the first time period corresponds to a possible active time of the DRX.

Optionally, the first time period includes one or more of following: a time determined based on a setting time of a DRX on duration timer; a time determined based on a setting time of a DRX on duration timer and a time offset value; a time determined based on a length of a DRX inactivity timer; a time determined based on a length of a DRX inactivity timer and a time offset value; a time determined based on a possible active time of the DRX; and a time determined based on a possible active time of the DRX and a time offset value.

Optionally, the time offset value is determined based on the length of the DRX inactivity timer.

Optionally, the setting time of the DRX on duration timer includes a runnable time of the DRX on duration timer, and the runnable time is independent of a wake-up signal indicating whether a terminal device is awake.

Optionally, when a wake-up signal indicates that the terminal device does not need to wake up in a first DRX cycle, transmission of the first signal is not performed in the first time period; or when a wake-up signal indicates that the terminal device does not need to wake up in a first DRX cycle, transmission of the first signal is performed in the first time period; or when a wake-up signal indicates that the terminal device does not need to wake up in a first DRX cycle, whether to transmit the first signal in the first time period is configured through higher-layer signaling.

Optionally, the possible active time of the DRX includes one or more of following: a setting time of a DRX on duration timer; and a time determined based on a setting time of a DRX on duration timer and a length of a DRX inactivity timer.

Optionally, the first time period includes a part or all of a setting time of a DRX on duration timer; or a starting time of the first time period is after the end of a setting time of a DRX on duration timer.

Optionally, the first information is sent by the base station through NRPPa signaling or sent by the terminal device through LPP signaling.

Optionally, the first signal includes one or more of following signals: an aperiodic SRS, a periodic SRS, an aperiodic PRS, a periodic PRS, and an on-demand PRS.

FIG. 9 is a schematic diagram of a structure of a communication apparatus according to still another embodiment of the present application. A communication apparatus 900 in FIG. 9 may be a terminal device or a base station. The communication apparatus 900 includes a determining module 910. The determining module 910 may be configured to: if a first time period overlaps a measurement gap, determine that the measurement gap is a valid measurement gap; and/or if the first time period does not overlap a measurement gap, determine that the measurement gap is an invalid measurement gap. The first time period includes one or more of following: a setting time of a DRX on duration timer; an active time of DRX; a time determined based on a setting time of a DRX on duration timer and a time offset value; and a time determined based on an active time of DRX and a time offset value.

FIG. 10 is a schematic diagram of a structure of a communication apparatus according to still another embodiment of the present application. A communication apparatus 1000 in FIG. 10 may be a terminal device. The communication apparatus 1000 includes a receiving module 1010 and a starting module 1020.

The receiving module 1010 may be configured to receive first DCI, where the first DCI is DCI scrambled by a PS-RNTI. The starting module 1020 may be configured to start a discontinuous reception DRX on duration timer if a priority of positioning measurement in a processing time window is higher than a priority of the first DCI, where the processing time window is used for positioning measurement or sending an SRS.

Optionally, the priority of the positioning measurement or the priority of the first DCI or both are configured through higher-level signaling or predefined through a protocol.

Optionally, the terminal device does not detect the first DCI before starting the DRX on duration timer.

Figure 11:
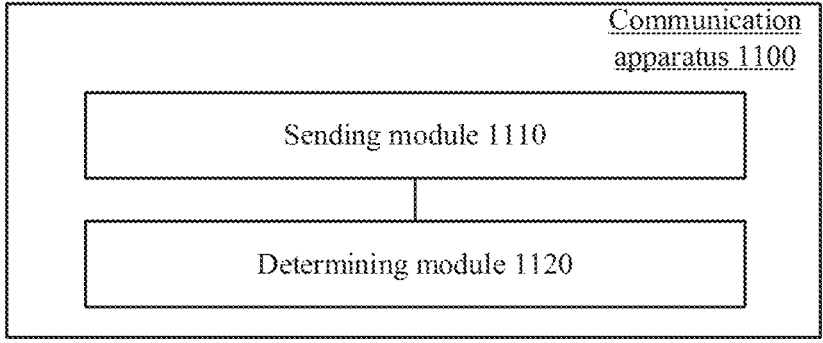
FIG. 11 is a schematic diagram of a structure of a communication apparatus according to still another embodiment of the present application.

FIG. 11 is a schematic diagram of a structure of a communication apparatus according to still another embodiment of the present application. A communication apparatus 1100 in FIG. 11 may be a base station. The communication apparatus 1100 may include a sending module 1110 and a determining module 1120.

The sending module 1110 may be configured to send first DCI, where the first DCI is DCI scrambled by a PS-RNTI. The determining module 1120 may be configured to determine that a terminal device starts a discontinuous reception DRX on duration timer if a priority of positioning measurement in a processing time window is higher than a priority of the first DCI, where the processing time window is used for positioning measurement or sending an SRS.

Optionally, the priority of the positioning measurement or the priority of the first DCI or both are configured through higher-level signaling or predefined through a protocol.

Optionally, the terminal device does not detect the first DCI before starting the DRX on duration timer.

Figure 12:
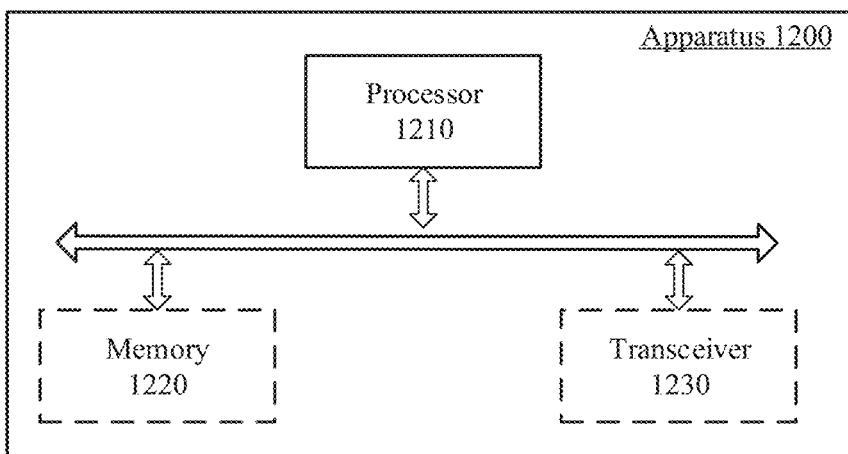
FIG. 12 is a schematic diagram of a structure of an apparatus according to the present application.

FIG. 12 is a schematic structural diagram of an apparatus according to an embodiment of the present application. The dashed lines in FIG. 12 indicate that the unit or module is optional. The apparatus 1200 may be configured to implement the methods described in the foregoing method embodiments. The apparatus 1200 may be a chip, a terminal device, a base station, or a positioning device.

The apparatus 1200 may include one or more processors 1210. The processor 1210 may allow the apparatus 1200 to implement the methods described in the foregoing method embodiments. The processor 1210 may be a general-purpose processor or a dedicated processor. For example, the processor may be a central processing unit (central processing unit, CPU). Alternatively, the processor may be another general-purpose processor, a digital signal processor (digital signal processor, DSP), an application-specific integrated circuit (application specific integrated circuit, ASIC), a field-programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

The apparatus 1200 may further include one or more memories 1220. The memory 1220 stores a program that may be executed by the processor 1210, so that the processor 1210 performs the method described in the foregoing method embodiments. The memory 1220 may be independent of the processor 1210 or may be integrated into the processor 1210.

The apparatus 1200 may further include a transceiver 1230. The processor 1210 may communicate with another device or chip through the transceiver 1230. For example, the processor 1210 may send and receive data to and from another device or chip by using the transceiver 1230.

An embodiment of the present application further provides a computer-readable storage medium for storing a program. The computer-readable storage medium may be applied to the terminal device, the base station, or the positioning device provided in the embodiments of the present application, and the program causes a computer to perform the method performed by the terminal, the base station, or the positioning device in various embodiments of the present application.

An embodiment of the present application further provides a computer program product. The computer program product includes a program. The computer program product may be applied to the terminal device, the base station, or the positioning device provided in the embodiments of the present application, and the program causes a computer to perform the method performed by the terminal, the base station, or the positioning device in various embodiments of the present application.

An embodiment of the present application further provides a computer program. The computer program may be applied to the terminal device, the base station, or the positioning device provided in the embodiments of the present application, and the program causes a computer to perform the method performed by the terminal, the base station, or the positioning device in various embodiments of the present application.

It should be understood that, in the embodiments of the present application, "B corresponding to A" means that B is associated with A, and B may be determined based on A. However, it should also be understood that, determining B based on A does not mean determining B based only on A, but instead B may be determined based on A and/or other information.

It should be understood that, in this specification, the term "and/or" is merely an association relationship that describes associated objects, and represents that there may be three relationships. For example, A and/or B may represent three cases: only A exists, both A and B exist, and only B exists. In addition, the character "/" in the specification generally indicates an "or" relationship between the associated objects.

It should be understood that, in the embodiments of the present application, sequence numbers of the foregoing processes do not mean execution sequences. The execution sequences of the processes should be determined according to functions and internal logic of the processes, and should not be construed as any limitation on the implementation processes of the embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatus or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual requirements to achieve the objectives of the solutions of the embodiments.

In addition, functional units in the embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to the embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A wireless communication method, comprising:

receiving, by a positioning device in a core network, first information associated with discontinuous reception (DRX); and determining, by the positioning device, a transmission time of a first signal based on the first information, wherein the first signal is a reference signal for positioning, and the transmission time of the first signal is within a first time period, wherein a time offset value is applied to cause a starting point of the first time period aligned with a starting point of an active time of the DRX, and wherein a higher-layer signaling is used to configure whether a terminal device transmits the first signal in the first time period in a scenario when the terminal device receives a wake-up signal indicating that the terminal device does not need to wake up in a first DRX cycle.

2. The method according to claim 1, wherein a setting time of the DRX on duration timer comprises a running time of the DRX on duration timer, and the running time is independent of a wake-up signal indicating whether a terminal device is awake.

3. The method according to claim 1, wherein the first information is sent by a base station through NRPPa signaling or sent by a terminal device through LPP signaling.

4. The method according to claim 1, wherein the first signal comprises one or more of following signals: an aperiodic sounding reference signal (SRS), a periodic SRS, an aperiodic positioning reference signal (PRS), a periodic PRS, and an on-demand PRS.

5. A wireless communication method, comprising:

sending, by a terminal device or a base station, first information associated with discontinuous reception (DRX) to a positioning device in a core network;

wherein the first information is used to determine a transmission time or a measurement time of a first signal, the first signal is a reference signal for positioning, and the transmission time of the first signal is within a first time period, wherein the first signal is a reference signal for positioning, and the transmission time of the first signal is within a first time period, wherein a time offset value is applied to cause a starting point of the first time period aligned with a starting point of an active time of the DRX, and wherein a higher-layer signaling is used to configure whether a terminal device transmits the first signal in the first time period in a scenario when the terminal device receives a wake-up signal indicating that the terminal device does not need to wake up in a first DRX cycle.

6. The method according to claim 5, wherein a setting time of the DRX on duration timer comprises a running time of the DRX on duration timer, and the running time is independent of a wake-up signal indicating whether a terminal device is awake.

7. The method according to claim 5, wherein the first information is sent by the base station through NRPPa signaling or sent by the terminal device through LPP signaling.

8. The method according to claim 5, wherein the first signal comprises one or more of following signals: an aperiodic sounding reference signal (SRS), a periodic SRS, an aperiodic positioning reference signal (PRS), a periodic PRS, and an on-demand PRS.

9. A device, wherein the device comprises:

at least one processor, one or more non-transitory computer-readable storage media coupled to the at least one processor and storing programming instructions for execution by the at least one processor, wherein the programming instructions, when executed, cause the device to perform operations comprising:

receiving first information associated with discontinuous reception (DRX); and determining a transmission time of a first signal based on the first information, wherein the first signal is a reference signal for positioning, and the transmission time of the first signal is within a first time period, wherein the first signal is a reference signal for positioning, and the transmission time of the first signal is within a first time period, wherein a time offset value is applied to cause a starting point of the first time period aligned with a starting point of an active time of the DRX, and wherein a higher-layer signaling is used to configure whether a terminal device transmits the first signal in the first time period in a scenario when the terminal device receives a wake-up signal indicating that the terminal device does not need to wake up in a first DRX cycle.

10. The device according to claim 9, wherein a setting time of the DRX on duration timer comprises a running time of the DRX on duration timer, and the running time is independent of a wake-up signal indicating whether a terminal device is awake.

11. The device according to claim 9, wherein the first information is sent by a base station through NRPPa signaling or sent by a terminal device through LPP signaling.

12. The device according to claim 9, wherein the first signal comprises one or more of following signals: an aperiodic sounding reference signal (SRS), a periodic SRS, an aperiodic positioning reference signal (PRS), a periodic PRS, and an on-demand PRS.

13. The method according to claim 1, wherein the first signal comprises an on-demand PRS.

* * * * *